(12) United States Patent
Hu et al.

(10) Patent No.: US 7,037,875 B2
(45) Date of Patent: May 2, 2006

(54) CATALYST SUPPORT

(75) Inventors: Zhicheng Hu, Edison, NJ (US); Knut Wasserman, Edison, NJ (US); Patrick L. Burk, Freehold, NJ (US); Youchang Xie, Beijing (CN); Wei Lin, Beijing (CN)

(73) Assignee: Engelhard Corporation, Iselin, NJ (US)

( * ) Notice: Subject to any disclaimer, the term of this patent is extended or adjusted under 35 U.S.C. 154(b) by 242 days.

(21) Appl. No.: 10/406,891

(22) Filed: Apr. 4, 2003

(65) Prior Publication Data

US 2004/0198592 A1    Oct. 7, 2004

(51) Int. Cl.
*B01J 23/10*    (2006.01)
(52) U.S. Cl. ............ 502/304; 502/325; 502/328; 502/330; 502/339; 502/349; 502/350
(58) Field of Classification Search ......... 502/304, 502/325, 328, 330, 339, 349, 350
See application file for complete search history.

(56) References Cited

U.S. PATENT DOCUMENTS

| | | | | |
|---|---|---|---|---|
| 4,134,860 A | | 1/1979 | Hindin et al. ............... 252/466 |
| 4,572,904 A | * | 2/1986 | Onal ........................... 502/333 |
| 4,868,148 A | | 9/1989 | Henk et al. ................. 502/304 |
| 5,073,658 A | * | 12/1991 | Saleh et al. ................. 585/530 |
| 5,212,142 A | | 5/1993 | Dettling ...................... 502/304 |
| 5,371,056 A | | 12/1994 | Leyrer et al. ................ 502/66 |
| 5,476,828 A | | 12/1995 | Kapteijn et al. ............. 502/324 |
| 5,597,771 A | | 1/1997 | Hu et al. ..................... 502/304 |
| 5,948,723 A | | 9/1999 | Sung ........................... 502/303 |
| 5,981,427 A | | 11/1999 | Sung et al. .................. 502/325 |
| 5,989,507 A | | 11/1999 | Sung et al. .............. 423/213.5 |
| 6,479,428 B1 | * | 11/2002 | Tonkovich et al. ......... 502/302 |
| 6,787,500 B1 | * | 9/2004 | Ito et al. ..................... 502/180 |
| 2004/0044252 A1 | * | 3/2004 | Liu et al. .................... 568/470 |

FOREIGN PATENT DOCUMENTS

| | | |
|---|---|---|
| EP | 0 992 276 A1 | 12/2000 |
| EP | 1 080 783 A2 | 7/2001 |
| EP | 1 066 874 A1 | 10/2001 |
| EP | 1 256 704 A2 | 11/2002 |
| JP | 2000-24499 | 1/2000 |

* cited by examiner

*Primary Examiner*—Christina Johnson
(74) *Attorney, Agent, or Firm*—Richard A. Negin

(57) ABSTRACT

A support for a catalyst for controlling vehicular exhaust emissions comprising a high surface area refractory metal oxide, e.g., gamma-alumina, having a monomolecular layer of a second oxide selected from the group consisting of titanium dioxide, cerium dioxide and zirconium dioxide. Typically, the monomolecular layer will have a thickness of less than about 10 angstroms. The support may be converted into a vehicular exhaust emission control catalyst by depositing the support on a substrate such as cordierite depositing a precious metal component such as platinum on at least part of the monomolecular layer. Preferably, the catalyst will also contain at least one $NO_x$ storage component deposited on at least part of the monomolecular layer. Catalysts prepared using the catalyst supports of the invention exhibit outstanding thermal stability and resistance to sulfur poisoning.

21 Claims, 4 Drawing Sheets

CATALYST SUPPORT

FIELD OF THE INVENTION

The present invention relates to a catalyst support useful for preparing a catalyst for the control of vehicular exhaust emissions. The catalysts containing the catalyst supports of the invention are especially useful for reducing the levels of hydrocarbon, carbon monoxide and nitrogen oxides present in the exhaust gas stream discharged from the exhaust manifold of a vehicular engine, which operates under alternating periods of lean and stoichiometric or rich conditions. Further, the catalysts containing the catalyst supports of the invention exhibit outstanding thermal stability and resistance to sulfur poisoning.

RELATED ART

Catalysts for control of vehicular exhaust emissions are well known in the prior art. Such catalysts have utility in a number of fields including the treatment of exhaust gas streams from internal combustion engines, such as automobile, truck and other gasoline-fueled engines. Typically, such prior art catalysts comprise a precious metal component such as platinum deposited on a refractory metal oxide support such as gamma-alumina that in turn is deposited on a substrate such as cordierite.

U.S. Pat. No. 4,134,860 relates to the manufacture of catalyst structures. The catalyst composition can contain platinum group metals, base metals, rare earth metals and refractory, such as alumina support. The composition can be deposited on a relatively inert carrier such as a honeycomb.

U.S. Pat. No. 4,438,219 discloses an alumina-supported catalyst for use on a substrate. The catalyst is stable at high temperatures. The stabilizing material may be one of several compounds including those derived from barium, silicon, rare earth metals, alkali and alkaline earth metals, boron, thorium, hafnium and zirconium. Of the stabilizing materials barium oxide, silicon dioxide and a rare earth oxide, which include lanthanum, cerium, praseodymium, neodymium, and others, are indicated to be preferred. It is disclosed that contacting them with some calcined alumina film permits the calcined alumina film to retain a high surface area at higher temperatures.

Typical prior art layered catalyst composites will comprise one or more platinum group metals (e.g., platinum, palladium, rhodium, rhenium and iridium) disposed on a high surface area, refractory metal oxide support, e.g., a high surface area alumina coating and will also contain one or more $NO_x$ trapping components, e.g., barium or potassium. The support is carried on a suitable substrate such as a monolithic carrier comprising a refractory ceramic or metal honeycomb structure, or refractory particles such as spheres or short, extruded segments of a suitable refractory material. Examples of such prior art include EP 1 080 783 A2 and EP 1 066 874 A1.

U.S. Pat. No. 4,134,860 relates to the manufacture of catalyst structures. The catalyst composition can contain platinum group metals, base metals, rare earth metals and refractory, such as alumina support. The composition can be deposited on a relatively inert carrier such as a honeycomb.

$SO_x$ tolerant $NO_x$ trap catalysts are also known. For example, see U.S. Pat. No. 6,419,890 that discloses $SO_x$ tolerant $NO_x$ trap catalyst composites comprising a platinum component, a support, a $NO_x$ sorbent component, and a spinel material prepared by calcining an anionic clay material.

U.S. Pat. No. 4,780,447 discloses a catalyst that is capable of controlling HC, CO and $NO_x$ as well as $H_2S$ in emissions from the tailpipe of catalytic converter-equipped automobiles. The use of the oxides of nickel and/or iron is disclosed as a hydrogen sulfide gettering-type of compound.

Japanese published patent application No. 2000-2449 discloses an exhaust gas control catalyst comprising a carrier that contains an oxide layer, alumina, a noble metal and a $NO_x$ trap material comprised on an alkali or alkaline earth metal oxide.

OBJECT OF THE INVENTION

It is an object of this invention to provide a catalyst support for a catalyst that will catalyze the oxidation of hydrocarbons and carbon monoxide and the reduction of nitrogen oxides to nitrogen with high efficiency and thermal durability and is able to remove sulfur compounds deposited on the catalyst under moderate conditions in respect to a vehicular engine which operates under alternating periods of lean and stoichiometric or rich conditions.

Thermal stability is an essential requirement of an exhaust emission catalyst. Thermal durability is required not only because the catalyst is exposed to a high temperature environment during normal engine operations, but also because the catalyst becomes poisoned due to the presence of sulfur in the fuel and it is necessary to refresh the $NO_x$ catalyst by repeated desulfation operations.

Desulfation of the exhaust emission catalyst normally requires a rich or rich/lean cyclic environment at high temperatures, e.g., >600° C. As a consequence of the desulfation operations, the catalyst will most likely be thermally deactivated. Accordingly, it is an object of the invention to provide a catalyst support for an exhaust emission catalyst that will be thermally stable after repeated high temperature cyclic operations and further that will be able to eliminate sulfur by desulfation operations.

SUMMARY OF THE INVENTION

The present invention relates to a catalyst support comprising a high surface area refractory metal oxide having a monomolecular layer of a second oxide selected from the group consisting of titanium dioxide, cerium dioxide and zirconium dioxide. The present invention also relates to vehicular exhaust emission catalysts prepared from such catalyst supports as well as to methods for preparing the catalyst supports and catalysts containing the catalyst supports.

DETAILED DESCRIPTION OF THE INVENTION

Figure 1:
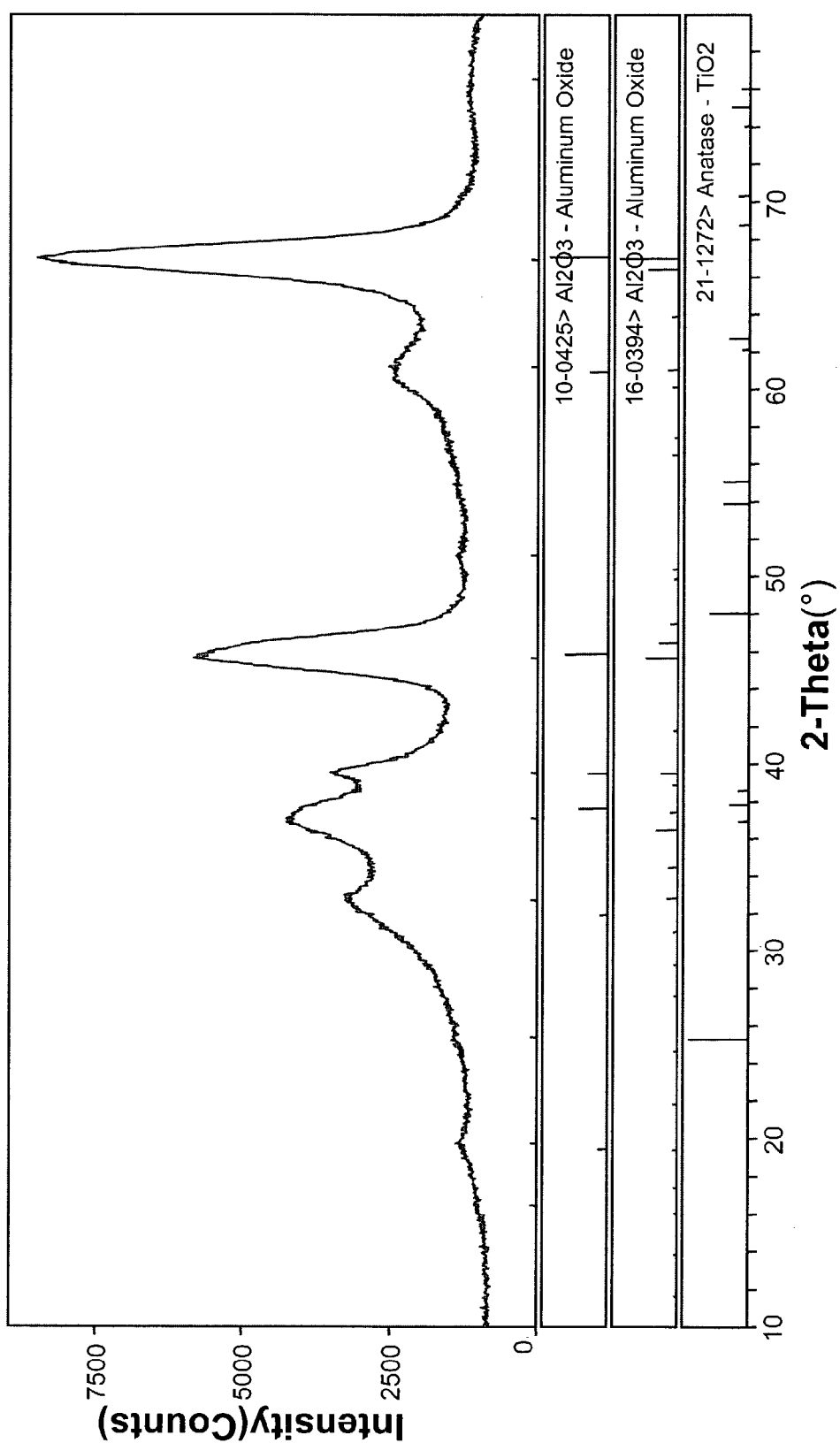
FIG. 1 is an x-ray diffraction graph of a catalyst support wherein a monomolecular layer titanium dioxide in the amount of 10 wt. % has been deposited on gamma-alumina.

The catalyst support of the invention comprises a high surface area refractory metal oxide having a monomolecular layer of a second oxide selected from the group consisting of titanium dioxide, cerium dioxide and zirconium dioxide deposited thereon.

Preferably, the second metal oxide comprises titanium dioxide. In general, the monomolecular layer deposited on the high surface area refractory metal oxide will have a thickness of less-than about 10 angstroms and will be present in an amount of about 5 to about 15 wt. %, based on the weight of the refractory metal oxide.

High surface area refractory metal oxides are well known in the prior art. Typically, the refractory metal oxide will have a specific surface area of about 60 to about 300 $m^2/g$. Useful refractory metal oxides include alumina, titania, zirconia and mixtures of alumina with one or more of titania, zirconia, ceria, baria and a silicate. Preferably, the refractory metal oxide comprises gamma-alumina. It is further preferred that the gamma-alumina is stabilized with an oxide of a metal selected from the group consisting of barium, silicon, zirconium, a rare earth metal and mixtures thereof. Typically, the stabilizer is utilized in an amount of about 0.01 to about 0.5 $g/in^3$. If desired, an additional layer of alumina, zirconia or a rare earth oxide may be deposited on at least part of the monomolecular layer, thereby creating a "sandwich" type of structure. The additional layer of oxides may be present in the amount of about 3 to about 25 wt. %.

The vehicular emission control catalysts of the invention will comprise the catalyst support described above and at least one precious metal component deposited on at least part of the monomolecular layer. It is further preferred that the catalyst support containing the precious metal component be deposited on a substrate (the term substrate is synonymous with the term "carrier").

The precious metal component may be platinum, palladium, rhodium and mixtures thereof. In general, the precious metal component will be present in a loading of about 10 to about 300 $g/ft^3$.

Preferably the substrate (or "carrier") is a ceramic or metal having a honeycomb structure. Any suitable substrate may be employed, such as a monolithic carrier of the type having fine, parallel gas flow passages extending therethrough from an inlet or an outlet face of the carrier, such that passages are open to fluid flow therethrough. The passages, which are essentially straight paths from their fluid inlet to their fluid outlet, are defined by walls on which the catalytic material is coated as a washcoat so that the gases flowing through the passages contact the catalytic material. The flow passages of the monolithic carrier are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e., cells) per square inch of cross section.

The ceramic carrier may be made of any suitable refractory material, e.g., cordierite, cordierite-α-alumina, silicon nitride, zircon mullite, spodumene, alumina-silica-magnesia, zircon silicate, sillimanite, a magnesium silicate, zircon, petalite, α-alumina, an aluminosilicate and the like; cordierite is preferred.

The substrates useful for the catalysts of the present invention may also be metallic in nature and be composed of one or more metals or metal alloys. The metallic substrates may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amounts of these metals may advantageously comprise at least 15 wt. % of the alloy, e.g., 10–25 wt. % of chromium, 3–8 wt. % of aluminum and up to 20 wt. % of nickel. The alloys may also contain small or trace amounts of one or more other metals such as manganese, copper, vanadium, titanium and the like. The surface or the metal carriers may be oxidized at high temperatures, e.g., 1000° C. and higher, to improve the corrosion resistance of the alloy by forming an oxide layer on the surface the carrier. Such high temperature-induced oxidation may enhance the adherence of the refractory metal oxide support and catalytically promoting metal components to the carrier.

If the catalyst support employed for the catalysts of the present invention has a "sandwich" type of structure as described above, the layer of alumina is deposited on at least part of the monomolecular layer and is disposed between the monomolecular layer and the precious metal component.

Catalysts containing the catalyst supports of the invention may also contain at least one $NO_x$ storage component, i.e., a $NO_x$ trap, in the amount of about 0.3 to about 1.5 $g/in^3$, deposited on at least part of the monomolecular layer. A suitable $NO_x$ storage component comprises a basic oxygenated compound of an alkali or alkaline earth metal; the alkali metal may be lithium, sodium, potassium or cesium, and the alkaline earth metal may be magnesium, calcium, strontium or barium. The preferred alkali metal comprises potassium, while the preferred alkaline earth metal comprises barium. If a "sandwich" type of structure is utilized when the $NO_x$ storage component is present, the layer of alumina is deposited on at least part of the monomolecular layer and is disposed between the monomolecular layer- and the precious metal component and the $NO_x$ storage component.

The catalysts of the invention may be readily prepared by the following steps:
 (a) depositing on a catalytic support a high surface area refractory metal oxide a monomolecular layer of a second oxide selected from the group consisting of titanium dioxide, cerium dioxide and zirconium dioxide;
 (b) impregnating the catalytic support resulting from step (a) with at least one metal support;
 (c) depositing the impregnated catalytic support resulting from step (b) upon a substrate; and
 (d) calcining the catalyst resulting from step (c).

Typically, step (a) may be carried out using well-known chemical vapor deposition ("CVD") techniques. For example, titanium tetrachloride is deposited in the gas phase on gamma-aluminum powder using CVD. Thereafter, the resultant material is exposed to a stream of moist nitrogen and it is calcined by heating in air at about 300 to about 500° C. for about 1 to about 6 hours. The calcined material is then washed to a point that the chloride content is <100 ppm and it is again calcined by heating in air at about 300 to about 750° C. for about 1 to about 6 hours.

If desired, the catalyst resulting from step (d) may be subsequently post-impregnated with at least one precious metal component and/or at least one $NO_x$ storage component and is thereafter again calcined to the extent necessary to convert any post-impregnated $NO_x$ storage component to its oxide form. The calcination in step (d) as well as for any calcination following post-impregnation may take place by heating the material in air at a temperature of about 300 to about 750° C. for about 1 to about 4 hours.

Typically, the precious metal component is utilized in the form of a compound or complex to achieve dispersion of the component on the refractory metal oxide support, e.g., gamma-alumina. For the purposes of the present invention, the term "precious metal component" means any compound, complex, or the like which, upon calcination or use thereof, decomposes or otherwise converts to a catalytically active form, usually the metal or the metal oxide. Water-soluble compounds or water-dispersible compounds or complexes of the precious metal component may be used as long as the liquid medium used to impregnate or deposit the precious metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the precious metals are preferred. For example, suitable compounds are chloroplatinic acid, amine-solubilized platinum hydroxide, palladium nitrate or palladium chloride, rhodium chloride, rhodium nitrate, hexamine rhodium chloride, etc. During the calcination step, or at least during the initial phase of use of the composite, such compounds are converted into a catalytically active form of the metal or a compound thereof.

A preferred method of preparing the catalyst of the invention is to prepare a mixture of a solution of a precious metal compound and the previously prepared catalyst support that is sufficiently dry to absorb substantially all of the solution to form a slurry. Preferably, the slurry is acidic, having a pH of about 2 to less than 7. The pH of the slurry may be lowered by the addition of a minor amount of an inorganic or organic acid such as hydrochloric or nitric acid, preferably acetic acid, to the slurry. Thereafter, if desired, the $NO_x$ storage component, and optional transition metal components, stabilizers and/or promoters may be added to the slurry in the form of soluble salts such as acetates (which will be converted to their oxide forms in the course of the calcination step).

In a particularly preferred embodiment, the slurry is thereafter comminuted to result in substantially all of the solids having particle sizes of less than 20 microns, i.e., 1–15 microns, in average diameter. The comminution may be accomplished in a ball mill or other similar equipment, and the solids content of the slurry may be, e.g., 20–60 wt. %, preferably 35–45 wt. %.

The following nonlimiting examples shall serve to illustrate the various embodiments of the present invention.

EXAMPLE 1

Two catalyst supports of the invention were prepared by depositing titanium dioxide on gamma alumina having a surface area of 150 $m^2/g$ using the CVD technique as described above. One catalyst support contained 6 wt. % titanium dioxide, while the other catalyst support contained 10 wt. % titanium dioxide. The x-ray diffraction pattern of the catalyst support calcined at 750° C. for six hours containing 10 wt. % titanium dioxide is shown in FIG. 1. It is significant to note that FIG. 1 does not show any reflexes for any titania phase.

EXAMPLE 2

Four catalyst formulations were prepared with the ingredients shown in Table I. In each formulation, the alumina was gamma-alumina having a surface area of 150 $m^2/g$. Catalyst "D" was formulated using the catalyst support of the invention as set forth in Example 1 wherein the titania content was 6 wt. %. Zirconyl acetate was also added during the milling process as a binder.

The procedure for preparing the catalysts was that set forth above. The $NO_x$ storage component was incorporated in each catalyst by post-dipping of the catalyst followed by calcination.

TABLE I

| | Amounts in g/in³ | | | |
|---|---|---|---|---|
| Ingredient | A | B | C | D |
| Bottom Coat | | | | |
| TiO₂ | 2 | 1 | | |
| Al₂O₃ | | 1 | 1.25 | |
| CeO₂—ZeO₂* | | | | 0.5 |
| Cat. Support of Ex. 1 (6 wt. % TiO₂ on alumina) | | | | 2 |
| Zr-Acetate | | 0.05 | 0.05 | 0.08 |
| La-Nitrate | | | 0.05 | |
| Ba-Acetate | | | 0.15 | |
| Platinum | 0.0174 | 0.0174 | 0.0347 | 0.0174 |
| Palladium | 0.0868 | 0.0868 | | 0.0868 |
| Top Coat | | | | |
| TiO₂ | 2 | 1 | | |
| Al₂O₃ | | 1 | 1.75 | |
| CeO₂—ZeO₂* | | | | 0.25 |
| Cat. Support of Ex. 1 (6 wt. % TiO₂ on alumina) | | | | 2 |
| Zr-Acetate | | 0.05 | 0.08 | 0.05 |
| Ba-Acetate | | | 0.2 | |
| Platinum | 0.0174 | 0.0174 | 0.0174 | 0.0174 |
| Palladium | | | 0.1157 | |
| Rhodium | 00087 | 0.0087 | 0.0174 | 0.0087 |
| NO_x Storage Component | | | | |
| BaO | 0.8 | 0.8 | 0.35** | 0.8 |
| Cs₂O | | 0.4 | | |
| K₂O | 0.4 | | 0.35 | 0.4 |

*composite material containing 20% ceria
**added to slurry

Formulations A, B, C and D were engine-aged at 580° C. for 60 hours in the presence of a fuel containing 150 ppm sulfur and at a space velocity of 27,000 $h^{-1}$. A comparison was then made of the "RS"(Rich Spike) $NO_x$ capacity measured in grams of $NO_2$/1.3 liters versus the inlet temperature (° C.) of the catalyst.

Figure 2:
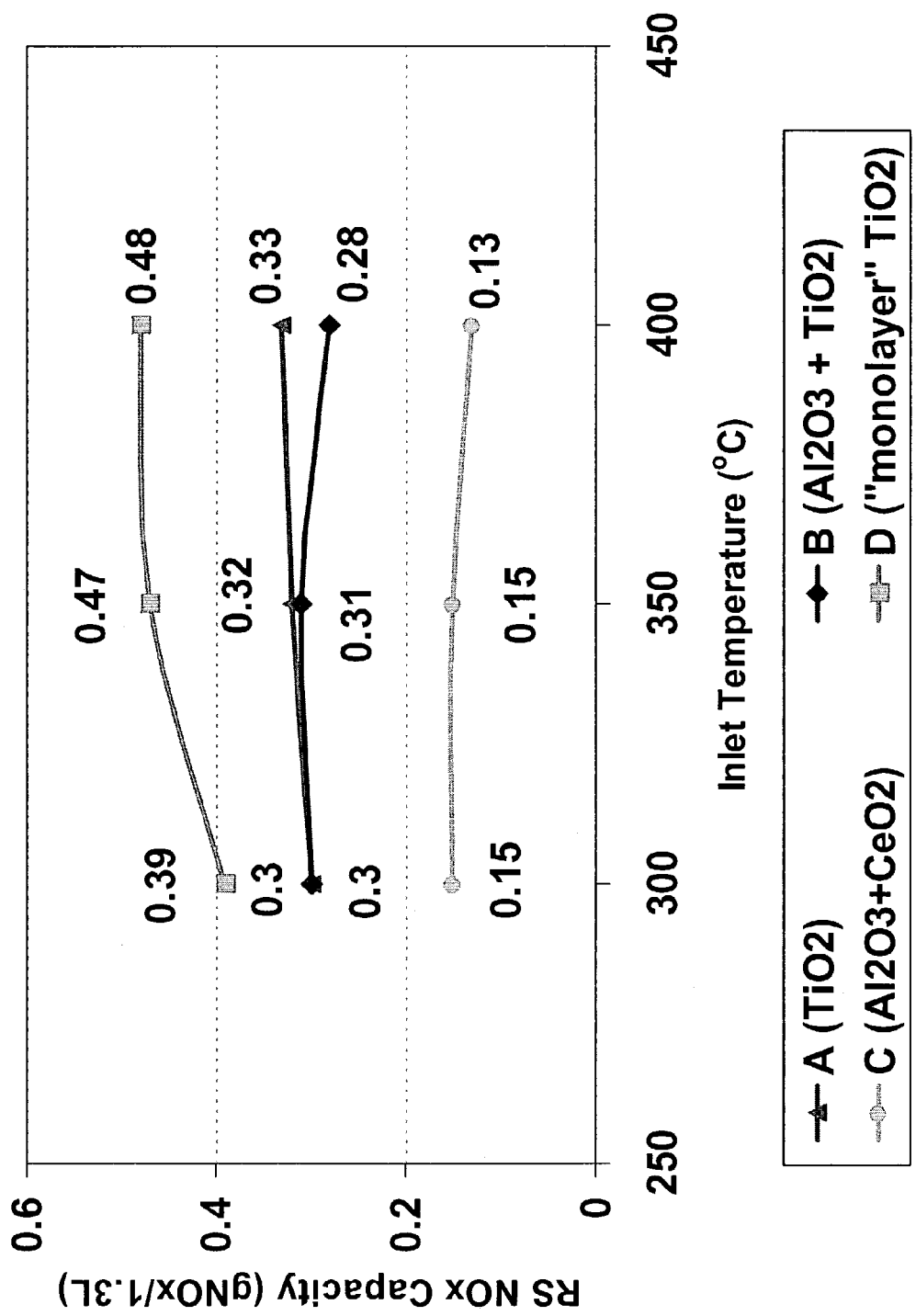
FIG. 2 is a graph that shows the sulfur tolerance of a catalyst containing the catalyst support of the invention as compared to several other typical catalysts.

The results of this comparison are graphically shown in FIG. 2. As may be seen from FIG. 2, catalyst D containing the catalyst support of the invention had significantly higher storage capacity than catalysts A, B or C after sulfur aging.

EXAMPLE 3

Catalysts A and D, formulated with the ingredients set forth in Table I, were evaluated for thermal stability. Each catalyst was aged in steam/air at 750° C. for 12 hours. Thereafter, the percentage of $NO_x$ conversion was measured at temperatures ranging from about 250 to. 550° C.

Figure 3:
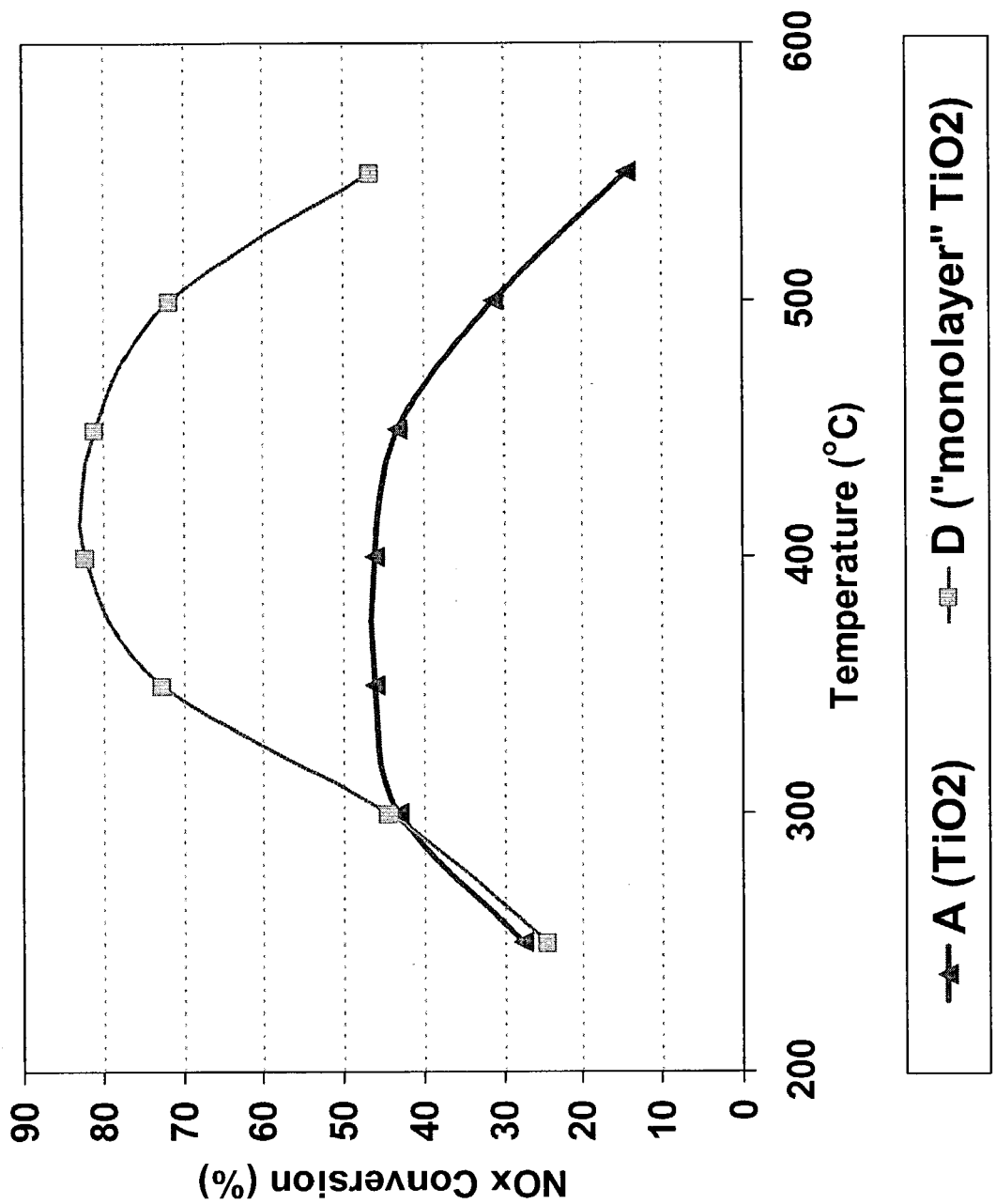
FIG. 3 is a graph that shows the thermal stability of a catalyst containing the catalyst support of the invention as compared to a catalyst containing only titanium dioxide as a support.

The results of this evaluation are shown graphically in FIG. 3. FIG. 3 shows that catalyst D containing the catalyst support of the invention has excellent thermal stability over the entire range of typical catalyst operation temperatures as compared to catalyst A that contains titanium dioxide only.

EXAMPLE 4

In this example, catalyst E containing the catalyst support of the invention wherein the titanium dioxide content of the monomolecular layer was 10% was compared to catalyst F wherein the catalyst support was solely gamma-alumina.

Catalyst Preparation for Catalyst E:

The bottom layer of the catalyst consisted of 75 g/ft$^3$ Pt, 0.42 g/in$^3$ BaO, 1.83 g/in$^3$ TiO$_2$-modified Al$_2$O$_3$ support and 0.05 g/in$^3$ ZrO$_2$, wherein the TiO$_2$-modified Al$_2$O$_3$ support was prepared by the CVD method so as to allow 10% TiO$_2$ by weight coverage on the surface of the alumina. The TiO$_2$-modified Al$_2$O$_3$ support material was impregnated with a Pt-amine salt solution to achieve the desired loading. The resultant powder was then milled to 90% of the particles below 10 micrometers (d90<10μ). The milling process, which requires the addition of water to the powder, resulted in a high-solids content slurry. Barium acetate was dissolved in water and mixed with the slurry. Zirconyl acetate was also added during the milling process as a binder.

The top layer of the catalyst consisted of 65 g/ft$^3$ Pt, 10 g/ft$^3$ Rh, 0.08 g/in$^3$ BaO, 1.20 g/in$^3$ of TiO$_2$-modified Al$_2$O$_3$ support (10 wt. % TiO$_2$) and 0.08 g/in$^3$ ZrO$_2$. Pt and Rh were sequentially impregnated on the TiO$_2$-modified Al$_2$O$_3$ support, and the resultant powder was then milled to d90<10μ. The barium acetate was dissolved in water and then added to the slurry.

Catalyst Preparation for Catalyst F:

Catalyst F was prepared in the same manner as catalyst E, with the exception that the support was Al$_2$O$_3$ rather than the TiO$_2$-modified Al$_2$O$_3$ support.

The two catalysts were subjected to sulfation tests conducted at a constant reaction temperature, i.e., 300° C., with 10 ppm SO$_2$ present in both lean and rich feed. The space velocity of the gas was 40,000 h$^{-1}$. The lean cycle lasted 60 seconds with λ=1.50 and the rich cycle lasted 6 seconds with λ=0.86. The sulfation process entailed a space velocity of 40,000 h$^{-1}$ for six hours at 450° C. The desulfation process entailed heating the gas stream and the catalyst to 650° C. for 15 minutes in a N$_2$ stream at a space velocity of 50,000 h$^{-1}$. At the targeted desulfation temperature (650° C.), a 5 second lean/15 second rich alternating stream was turned on. Each catalyst was exposed to the alternating stream for 5 minutes, which completed the desulfation process.

Figure 4:
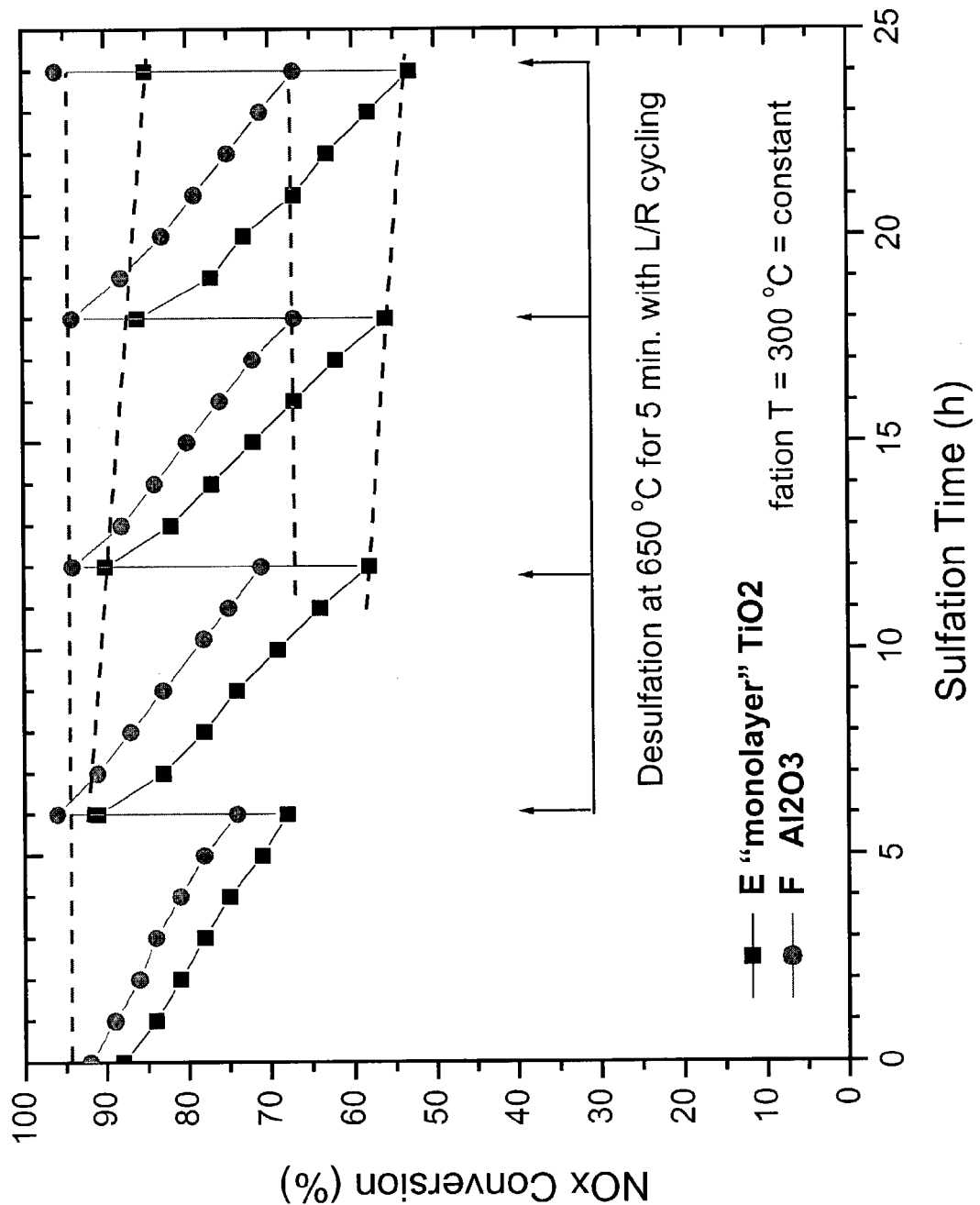
FIG. 4 is a graph that compares the $NO_x$ conversion for a catalyst containing the catalyst support of the invention versus a typical catalyst after several sulfation and desulfation steps.

The data were collected every hour and each collection period lasted for 10 minutes. The averaged NO$_x$ conversions at a given point in time are graphically shown in FIG. 4. FIG. 4 shows four consecutive sulfation and desulfation runs. As may be seen from FIG. 4, the NO$_x$ conversion for catalyst E containing the catalyst support of the invention fully recovered to its original level after each desulfation step. However, catalyst F utilizing only alumina showed a continuous loss in NO$_x$ conversion capacity after each desulfation step.

What is claimed is:

1. A support for a catalyst for controlling vehicular exhaust emissions comprising a high surface area refractory metal oxide having a deposit thereon, said deposit comprising a monomolecular layer of a second oxide selected from the group consisting of titanium dioxide, cerium dioxide and zirconium dioxide; at least one precious metal component deposited on at least part of the monomolecular layer and a layer of alumina, zirconia or a rare earth oxide deposited on at least part of the monomolecular layer and disposed between the monomolecular layer and the precious metal component.

2. The support of claim 1 wherein the precious metal component is selected from the group consisting of platinum, palladium, rhodium and mixtures thereof.

3. A support for a catalyst for controlling vehicular exhaust emissions comprising a high surface area refractory metal oxide having a deposit thereon, said deposit comprising a monomolecular layer of a second oxide selected from the group consisting of titanium dioxide, cerium dioxide and zirconium dioxide wherein a layer of alumina is deposited on at least part of the monomolecular layer.

4. The support of claim 3 wherein the monomolecular layer has a thickness of less than about 10 angstroms.

5. The support of claim 3 wherein the second oxide comprises titanium dioxide.

6. The support of claim 3 wherein the refractory metal oxide comprises gamma-alumina.

7. The support of claim 6 wherein the gamma-alumina is stabilized with an oxide of a metal selected from the group consisting of barium, silicon, zirconium, a rare earth metal and mixtures thereof.

8. The support of claim 3 wherein the support is deposited upon a substrate comprising a ceramic or metal having a honeycomb structure.

9. The support of claim 8 wherein the ceramic comprises cordierite.

10. A support for a catalyst for controlling vehicular exhaust emissions comprising a high surface area refractory metal oxide having a deposit thereon, said deposit comprising a monomolecular layer of a second oxide selected from the group consisting of titanium dioxide, cerium dioxide and zirconium dioxide; at least one precious metal component deposited on at least part of the monomolecular layer; at least one NO$_x$ storage component deposited on at least part of the monomolecular layer; and a layer of alumina, zirconia or a rare earth oxide deposited on at least part of the monomolecular layer and disposed between the monomolecular layer and the precious metal component and the NO$_x$ storage component.

11. The support of claim 10 wherein the NO$_x$ storage component comprises a basic oxygenated compound of an alkali metal or an alkaline earth metal.

12. A catalyst for controlling vehicular exhaust emissions comprising:
(a) a catalyst support comprising a high surface area refractory metal oxide having a deposit thereon, said deposit comprising a mono-molecular layer of a second oxide selected from the group consisting of titanium dioxide, cerium dioxide and zirconium dioxide and a layer of alumina, zirconia or a rare earth oxide deposited on at least part of the monomolecular layer and disposed between the monomolecular layer and the precious metal component; and
(b) at least one precious metal deposited on at least part of the mono-molecular layer.

13. The catalyst of claim 12 wherein the monomolecular layer has a thickness of less than about 10 angstroms.

14. The catalyst of claim 12 wherein the second oxide comprises titanium dioxide.

15. The catalyst of claim 12 wherein the refractory metal oxide comprises gamma-alumina.

16. The catalyst of claim 15 wherein the gamma-alumina is stabilized with an oxide of a metal selected from the group consisting of barium, silicon, zirconium, a rare earth metal and mixtures thereof.

17. The catalyst of claim 12 wherein the support is deposited upon a substrate comprising a ceramic or metal having a honeycomb structure.

18. The catalyst of claim 17 wherein the ceramic comprises cordierite.

19. The catalyst of claim 12 wherein the precious metal component is selected from the group consisting of platinum, palladium, rhodium and mixtures thereof.

20. A catalyst for controlling vehicular exhaust emissions comprising:
   (a) a catalyst support comprising a high surface area refractory metal oxide having a deposit thereon, said deposit comprising a mono-molecular layer of a second oxide selected from the group consisting of titanium dioxide, cerium dioxide and zirconium; and
   (b) at least one precious metal deposited on at least part of the mono-molecular layer; at least one $NO_x$ storage component deposited on at least part of the monomolecular layer; and a layer of alumina, zirconia or a rare earth oxide deposited on at least part of the monomolecular layer and disposed between the monomolecular layer and the precious metal component and the $NO_x$ storage component.

21. The catalyst of claim 20 wherein the $NO_x$ storage component comprises a basic oxygenated compound of an alkali metal or an alkaline earth metal.

* * * * *